(12) United States Patent
Takasaki et al.

(10) Patent No.: US 7,192,475 B2
(45) Date of Patent: *Mar. 20, 2007

(54) AQUEOUS INK

(75) Inventors: Masaru Takasaki, Minami-Ashigara (JP); Toshiki Fujiwara, Minami-Ashigara (JP); Tomohiro Chino, Minami-Ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,368

(22) Filed: Dec. 14, 2004

(65) Prior Publication Data

US 2005/0150420 A1    Jul. 14, 2005

(30) Foreign Application Priority Data

| Jan. 9, 2004 | (JP) | ............................. 2004-003799 |
| Aug. 24, 2004 | (JP) | ............................. 2004-243269 |

(51) Int. Cl.
*C09D 11/00* (2006.01)
*C09D 11/02* (2006.01)

(52) U.S. Cl. ................ 106/31.5; 106/31.48; 106/31.52

(58) Field of Classification Search ............ 106/31.52, 106/31.5, 31.48; 534/761, 757; 347/100
See application file for complete search history.

(56) References Cited

U.S. PATENT DOCUMENTS

| 4,124,581 | A | * | 11/1978 | Vor der Bruck et al. .... 534/761 |
| 4,908,435 | A | * | 3/1990 | Gregory ...................... 534/761 |
| 5,175,260 | A | * | 12/1992 | Schroeder et al. |
| 7,029,523 | B2 | * | 4/2006 | Taguchi et al. .......... 106/31.52 |
| 7,037,365 | B2 | * | 5/2006 | Taguchi et al. .......... 106/31.52 |
| 2004/0187232 | A1 | * | 9/2004 | Chino et al. .................... 8/639 |
| 2005/0061201 | A1 | * | 3/2005 | Takasaki et al. ......... 106/31.52 |
| 2005/0074684 | A1 | * | 4/2005 | Yabuki et al. ......... 430/108.23 |
| 2005/0139121 | A1 | * | 6/2005 | Fujiwara et al. ............ 106/31.5 |
| 2005/0139123 | A1 | * | 6/2005 | Fujiwara .................. 106/31.48 |
| 2005/0243151 | A1 | * | 11/2005 | Chino et al. ................. 347/100 |

FOREIGN PATENT DOCUMENTS

| EP | 0492911 | * | 7/1992 |
| EP | 1 172 422 A2 | * | 1/2002 |
| EP | 1 420 051 A1 | * | 5/2004 |
| JP | 2003-306623 | * | 10/2003 |
| WO | 03/087238 A1 | * | 10/2003 |

OTHER PUBLICATIONS

European Search Report dated Mar. 9, 2005.*

* cited by examiner

*Primary Examiner*—Helene Klemanski
(74) *Attorney, Agent, or Firm*—Buchanan Ingersoll & Rooney PC

(57) ABSTRACT

An aqueous ink comprising at least two dyes each having at least one ionic hydrophilic group in a molecule thereof, wherein at least one of said at least two dyes includes an azo dye represented by formula (1):

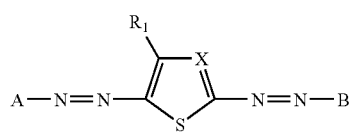

Formula (1)

wherein A and B each independently represents a substituted or unsubstituted monovalent aromatic group; or a substituted or unsubstituted monovalent heterocyclic group; $R_1$ represents a hydrogen atom; a substituted or unsubstituted aromatic group; or a substituted or unsubstituted heterocyclic group; and X represents $-CR_2=$ or a nitrogen atom, and when X represents $-CR_2=$, $R_2$ represents a hydrogen atom or a substituent.

11 Claims, No Drawings

AQUEOUS INK

BACKGROUND OF THE INVENTION

1. Field of the Invention

The present invention relates to an aqueous ink having good hue and high fastness and printing density, use thereof as an ink for inkjet recording, and an inkjet recording method.

2. Description of the Related Art

An inkjet recording method is rapidly spreading and further developing because the material costs are inexpensive, high-speed recording is possible, a noise at the time of recording is low, and color recording is easy.

The inkjet recording method includes a continuous system of continuously flying droplets and an on-demand system of flying droplets according to an image information signal; and its discharge system includes a system of discharging droplets by applying a pressure by a piezo element, a system of discharging droplets by generating bubbles in an ink by heat, a system of using ultrasonic waves, and a system of sucking and discharging droplets by an electrostatic force. Also, aqueous inks, oily inks, and solid (melt type) inks are used as an ink for inkjet recording. Of these inks, aqueous inks are the main current from the standpoints of manufacture, handling properties, odors, safety, and so on.

Colorants which are used in such inks for inkjet recording are required to have such properties that they have good solubility or dispersibility in solvents; they can achieve high-density recording; they have good hue; they are fast to light, heat and active gases in the circumstance (for example, oxidizing gases such as NOx and ozone, and SOx); they have excellent fastness to water and chemicals; they have good fixability to an image-receiving material so that they hardly cause bleeding; they have excellent preservability as an ink; they are non-toxic; they have a high purity; and they are inexpensively available. However, it is extremely difficult to find out colorants, which meet these requirements in high levels.

As azo dyes having good hue, dyes disclosed in JP-A-2003-306623 are known, but any specific combination containing two or more kinds of dyes each having at least one ionic hydrophilic group in the molecule thereof is not disclosed.

SUMMARY OF THE INVENTION

Problems of the invention are to solve the foregoing problems and to achieve the following object.

That is, an object of the invention is to provide colored images and colored materials having good hue, excellent fastness to light and active gases in the circumstance, particularly an ozone gas, and high printing density.

For the purpose of realizing dyes having good hue, excellent fastness to light and active gases in the circumstance, particularly an ozone gas, and high printing density, the present inventors studied a variety of dye compound derivatives in detail. As a result, it has been found that the foregoing problems can be solved by an aqueous ink containing two or more kinds of dyes, at least one kind of the dyes being an azo dye represented by the following general formula (1).

(1) An aqueous ink comprising at least two dyes each having at least one ionic hydrophilic group in a molecule thereof, wherein at least one of said at least two dyes includes an azo dye represented by formula (1):

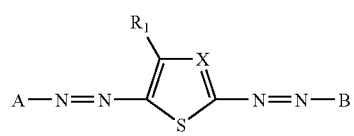

Formula (1)

wherein A and B each independently represents a substituted or unsubstituted monovalent aromatic group; or a substituted or unsubstituted monovalent heterocyclic group;

$R_1$ represents a hydrogen atom; a substituted or unsubstituted aromatic group; or a substituted or unsubstituted heterocyclic group; and X represents $-CR_2=$ or a nitrogen atom, and when X represents $-CR_2=$, $R_2$ represents a hydrogen atom or a substituent.

(2) The aqueous ink as described in (1) above, wherein B represents a substituted or unsubstituted heterocyclic group.

(3) The aqueous ink as described in (1) or (2) above, wherein the azo dye is represented by formula (2):

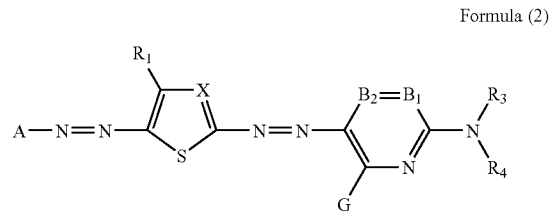

Formula (2)

wherein A, $R_1$ and X are the same as A, $R_1$ and X in formula (1);

$B_1$ and $B_2$ each independently represents $=CR_5-$ or $-CR_6=$, or either one of them represents a nitrogen atom and the other represents $=CR_5-$ or $-CR_6=$;

G, $R_3$, $R_4$, $R_5$ and $R_6$ each independently represents a hydrogen atom or a substituent; and preferably, at least one of G, $R_3$ and $R_4$ comprises at least one ionic hydrophilic group.

(4) The aqueous ink as described in (3) above, wherein $R_3$ and $R_4$ each independently represents a hydrogen atom; an aliphatic group; an aromatic group; a heterocyclic group; an acyl group; an alkoxycarbonyl group; an aryloxycarbonyl group; a carbamoyl group; an alkyl- or aryl-sulfonyl group; or a sulfamoyl group, and $R_3$ and $R_4$ do not represent a hydrogen atom at the same time;

G, $R_5$, and $R_6$ each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; a heterocyclic oxycarbonyl group; an acyl group; a hydroxyl group; an alkoxy group; an aryloxy group; a heterocyclic oxy group; a silyloxy group; an acyloxy group; a carbamoyloxy group; an alkoxycarbonyloxy group; an aryloxy-carbonyloxy group; an amino group substituted with an alkyl group, an aryl group or a heterocyclic group; an acylamino group, an ureido group; a sulfamoylamino group; an alkoxy-carbonylamino group; an aryloxycarbonylamino group; an alkyl- or aryl-sulfonylamino group; a heterocyclic sulfonylamino group; a nitro group; an alkyl- or aryl-thio group; a heterocyclic thio group; an alkyl- or aryl-sulfonyl group; a heterocyclic sulfonyl group; an alkyl- or aryl-sulfinyl group; a heterocyclic sulfinyl group; a sulfamoyl group; or a sulfo group;

each of these groups may be substituted; and $R_5$ and $R_6$, $R_3$ and $R_5$, or $R_3$ and $R_4$ may be taken together to form a 5- or 6-membered ring.

(5) The aqueous ink as described in (3) or (4) above, wherein the azo dye is represented by formula (4):

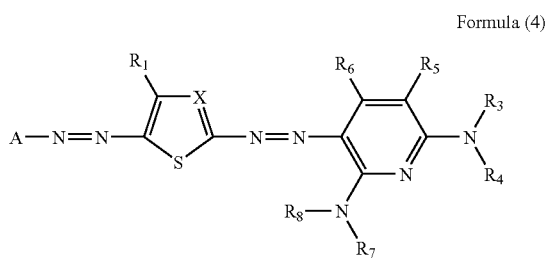

Formula (4)

wherein A, $R_1$, X, $R_3$, $R_4$, $R_5$ and $R_6$ are the same as A, $R_1$, X, $R_3$, $R_4$, $R_5$ and $R_6$ in formula (2); and $R_7$ and $R_8$ are the same as $R_3$ and $R_4$ in formula (4)

(6) The aqueous ink as described in (5) above, wherein the azo dye is represented by formula (5):

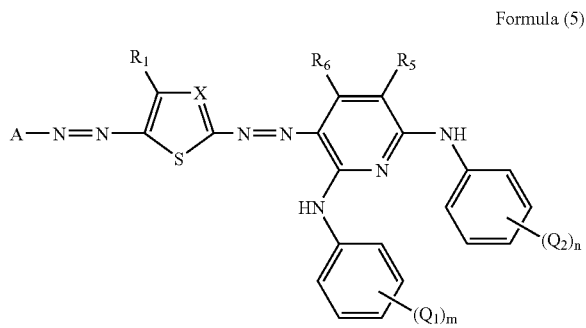

Formula (5)

wherein A, $R_1$, X, $R_5$ and $R_6$ are the same as A, $R_1$, X, $R_5$ and $R_6$ in formula (4);

$Q_1$ and $Q_2$ each independently represents an ionic hydrophilic group;

m and n each independently represents an integer of from 1 to 3; and each of these groups may be substituted.

(7) The aqueous ink as described in (1) or (2) above, wherein each of said at least two dyes independently includes an azo dye represented by formula (1).

(8) The aqueous ink as described in (3) or (4) above, wherein each of said at least two dyes independently includes an azo dye represented by formula (2).

(9) An ink for inkjet recording comprising an aqueous ink as described in any of (1) to (8) above.

(10) An inkjet recording method comprising forming an image with an ink for inkjet recording as described in (9) above.

(11) The inkjet recording method as described in (10) above, wherein the image is formed on an image-receiving material comprising a support having thereon an ink-receiving layer including a white inorganic pigment particle.

DETAILED DESCRIPTION OF THE INVENTION

The invention will be described below in detail. The azo dyes represented by the foregoing general formula (1) and the general formula (2) as a lower concept thereof according to the invention will be described below in detail. First of all, the groups and substituents of these general formulae will be described below.

Examples of the halogen atom include a fluorine atom, a chlorine atom, a bromine atom, and an iodine atom.

In this specification, the aliphatic group means an alkyl group, a substituted alkyl group (including an aralkyl group and a substituted aralkyl group), an alkenyl group, a substituted alkenyl group, an alkynyl group, or a substituted alkynyl group. The aliphatic group may be branched or may form a ring. The carbon atom number of the aliphatic group is preferably from 1 to 20, and more preferably from 1 to 16. The aryl moiety of the aralkyl group and substituted aralkyl group is preferably a phenyl group or a naphthyl group, and especially preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoro-methyl group, a 3-sulfopropyl group, a 4-sulfobutyl group, a cyclohexyl group, a benzyl group, a 2-phenethyl group, a vinyl group, and an allyl group.

In this specification, the monovalent aromatic group means an aryl group or a substituted aryl group. The aryl group is preferably a phenyl group or a naphthyl group, and especially preferably a phenyl group. The carbon atom number of the monovalent aromatic group is preferably from 6 to 20, and more preferably from 6 to 16. Examples of the monovalent aromatic group include a phenyl group, a p-tolyl group, a p-methoxyphenyl group, an o-chlorophenyl group, and an m-(3-sulfopropylamino)phenyl group. The divalent aromatic group is one in which such a monovalent aromatic group is made divalent. Examples thereof include a phenylene group, a p-tolylene group, a p-methoxyphenylene group, an o-chloro-phenylene group, an m-(3-sulfopropylamino)phenylene group, and a naphthylene group.

The heterocyclic group includes a heterocyclic group having a substituent and an unsubstituted heterocyclic group. The heterocycle may be fused with an aliphatic ring, an aromatic ring or other heterocycle. The heterocyclic group is preferably a 5-membered or 6-membered heterocyclic group. Examples of the hetero atom of the heterocycle include N, O, and S. Examples of the foregoing substituent include an aliphatic group, a halogen atom, an alkyl- or aryl-sulfonyl group, an acyl group, an acylamino group, a sulfamoyl group, a carbamoyl group, and an ionic hydrophilic group. Examples of the heterocyclic group include a 2-pyridyl group, a 2-thienyl group, a 2-thiazolyl group, a 2-benzothiazolyl group, a 2-benzoxazolyl group, and a 2-furyl group.

The carbamoyl group includes a carbamoyl group having a substituent and an unsubstituted carbamoyl group. Examples of the foregoing substituent include an alkyl group. Examples of the foregoing carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the foregoing alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the foregoing substituent include an ionic hydrophilic group. Examples of the foregoing aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The hetero-cyclic oxycarbonyl group is preferably a heterocyclic oxycarbonyl group having from 2 to 20 carbon atoms. Examples of the foregoing substituent include an ionic hydrophilic group. Examples of the foregoing heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the foregoing substituent include an ionic hydrophilic group. Examples of the foregoing acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group, and an ionic hydrophilic group. Examples of the foregoing alkoxy group include a methoxy group, an ethoxy group, an isopropoxy group, a methoxyethoxy group, a hydroxyethoxy group, and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the foregoing substituent include an alkoxy group and an ionic hydrophilic group. Examples of the foregoing aryloxy group include a phenoxy group, a p-methoxy-phenoxy group, and an o-methoxyphenoxy group.

The heterocyclic oxy group includes a heterocyclic oxy group having a substituent and an unsubstituted heterocyclic oxy group. The foregoing heterocyclic oxy group is preferably a heterocyclic oxy group having from 2 to 20 carbon atoms. Examples of the foregoing substituent include an alkyl group, an alkoxy group, and an ionic hydrophilic group. Examples of the foregoing heterocyclic oxy group include a 3-pyridyloxy group and a 3-thienyloxy group.

The silyloxy group is preferably a silyloxy group substituted with an aliphatic group or an aromatic group each having from 1 to 20 carbon atoms. Examples of the silyloxy group include a trimethylsilyloxy group and a diphenylmethyl-silyloxy group.

The acyloxy group includes an acyloxy group having a substituent and an unsubstituted acyloxy group. The acyloxy group is preferably an acyloxy group having from 1 to 20 carbon atoms. Examples of the foregoing substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyl-oxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxy-carbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted with an alkyl group, an aryl group or a heterocyclic group, and each of the alkyl group, aryl group and heterocyclic group may further have a substituent. The alkylamino group is preferably an alkylamino group having from 1 to 20 carbon atoms. Examples of the substituent include an ionic hydrophilic group. Examples of the alkylamino group include a methylamino group and a diethylamino group. The arylamino group includes an arylamino group having a substituent and an unsubstituted arylamino group and further includes an anilino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group. The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom, and an ionic hydrophilic group.

The acylamino group includes an acylamino group having a substituent and an unsubstituted acylamino group. The foregoing acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group, and a 3,5-disulfobenzoylamino group.

The ureido group includes an ureido group having a substituent and an unsubstituted ureido group. The ureido group is preferably an ureido group having from 1 to 20 carbon atoms. Examples of the substituent include an alkyl group and an aryl group. Examples of the ureido group include a 3-methylureido group, a 3,3-dimethylureido group, and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-di-propylsulfamoylamino group.

The alkoxycarbonylamino group includes an alkoxy-carbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkyl- or aryl-sulfonylamino group includes an alkyl- or aryl-sulfonylamino group having a substituent and an unsubstituted alkyl- or aryl-sulfonylamino group. The sulfonylamino group is preferably a sulfonylamino group having from 1 to 20 carbon atoms. Examples of the substituent include an ionic hydrophilic group. Examples of the sulfonyl group include a methylsulfonylamino group, an N-phenyl-methyl-sulfonylamino group, a phenylsulfonylamino group, and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkyl-, aryl- or heterocyclic thio group includes an alkyl-, aryl- or heterocyclic thio group having a substituent and an unsubstituted alkyl-, aryl- or heterocyclic thio group. The alkyl-, aryl- or heterocyclic thio group is preferably one having from 1 to 20 carbon atoms. Examples of the substituent include an ionic hydrophilic group. Examples of the alkyl-, aryl- or heterocyclic thio group include a methylthio group, a phenylthio group, and a 2-pyridylthio group.

The alkyl- or aryl-sulfonyl group includes an alkyl- or aryl-sulfonyl group having a substituent and an unsubstituted alkyl- or aryl-sulfonyl group. Examples of the alkyl- or arylsulfonyl group include a methylsulfonyl group and a phenylsulfonyl group.

The alkyl- or aryl-sulfinyl group includes an alkyl- or aryl-sulfinyl group having a substituent and an unsubstituted alkyl- or aryl-sulfinyl group. Examples of the alkyl- or arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Next, the general formulae (1) and (2) will be described below. In the following description, with respect to the groups and substituents, those already described are applicable.

In the general formula (1), $R_1$ represents a hydrogen atom; a substituted or unsubstituted aromatic group; or a substituted or unsubstituted heterocyclic group. $R_1$ is preferably a substituted phenyl group; a substituted or unsubstituted naphthyl group; or a substituted or unsubstituted heterocyclic group (for example, a pyrrole ring, an imidazole ring, a thiazole ring, a benzothiazole ring, a pyridine ring, and a pyridazine ring), and especially preferably, a substituted phenyl group (especially a substituted phenyl group at the p-position); a substituted or unsubstituted β-naphthyl group; a pyridine ring; or a thiazole ring. As the substituent, the substituents described previously are enumerated.

In the general formula (1), X represents —$CR_2$= or a nitrogen atom, and when X represents —$CR_2$=, $R_2$ represents a hydrogen atom or a substituent. The substituent represented by $R_2$ is preferably an electron withdrawing group. The electron withdrawing group as referred to herein means a substituent having an electron withdrawing nature by an electron effect and when a Hammett's substituent constant σp value which is an index of electron withdrawing properties or electron donating properties of a substituent is used, is a substituent having a large σp value. Examples thereof include a cyano group, a nitro group, a halogen atom, a sulfone group, a trifluoromethyl group, a carbamoyl group, an alkoxycarbonyl group, and an alkyl- or aryl-sulfonyl group. The Hammett's substituent constant σp value will be hereunder described a little. The Hammett's rule is a rule of thumb proposed by L. P. Hammett in 1935 for the purpose of quantitatively discussing influences of substituents against reaction or equilibrium of benzene derivatives, and its appropriateness is widely admitted at present. The substituent constant determined according to the Hammett's rule includes a σp value and a σm value. Although these values can be found in general publications, they are described in detail in, for example, J. A. Dean, *Lange's Handbook of Chemistry*, 12th ed., 1979 (McGraw-Hill) and Kagaku No Ryoiki (Chemical Region), Special Issue, No. 122, pp. 96–103, 1979 (Nankodo). As the electron withdrawing group of $R_2$, a cyano group is especially preferable.

In the general formula (1), A and B each independently represents a monovalent aromatic group which may be substituted (for example, an aryl group); or a monovalent heterocyclic group which may be substituted. Examples of the aromatic ring include a benzene ring and a naphthalene ring; and examples of the hetero atom of the heterocycle include N, O, and S. The heterocycle may be fused with an aliphatic ring, an aromatic ring, or other heterocycle. The substituent may be an arylazo group or a heterocyclic azo group.

At least one of A and B is preferably a heterocycle, and especially preferably, B is a heterocycle. Preferred examples of A include an aromatic ring, a pyrazole ring, an imidazole ring, an isothiazole ring, a thiadiazole ring, and a benzothiazole ring. Of these, an aromatic ring and a pyrazole ring are preferable.

As the heterocyclic ring of B, an aromatic nitrogen-containing 6-membered heterocyclic group represented by the following general formula (3) is preferable. In the case where B represents an aromatic nitrogen-containing 6-membered heterocyclic group represented by the following general formula (3), the general formula (1) is corresponding to the general formula (2).

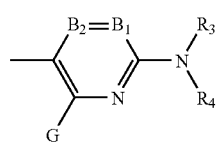

Formula (3)

In the general formulae (2) and (3), $B_1$ and $B_2$ each independently represents =$CR_5$— or —$CR_6$=, or either one of them represents a nitrogen atom and the other represents =$CR_5$— or —$CR_6$=; and preferably, $B_1$ and $B_2$ each independently represents =$CR_5$— or —$CR_6$=.

$R_3$ and $R_4$ each independently represents a hydrogen atom; an aliphatic group; an aromatic group; a heterocyclic group; an acyl group; an alkoxycarbonyl group; an aryloxycarbonyl group; a carbamoyl group; an alkyl- or aryl-sulfonyl group; or a sulfamoyl group, each of which may further have a substituent. Of the substituents represented by $R_3$ and $R_4$, a hydrogen atom; an aliphatic group; an aromatic group; a heterocyclic group; an acyl group; and an alkyl- or aryl-sulfonyl group are preferable, a hydrogen atom; an aromatic group; a heterocyclic group; an acyl group; and an alkyl- or aryl-sulfonyl group are more preferable, and a hydrogen atom; an aryl group; and a heterocyclic ring are the most preferable. Each of these groups may further have a substituent. However, $R_3$ and $R_4$ do not represent a hydrogen atom at the same time.

G, $R_5$, and $R_6$ each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; a heterocyclic oxycarbonyl group; an acyl group; a hydroxyl group; an alkoxy group; an aryloxy group; a heterocyclic oxy group; a silyloxy group; an acyloxy group; a carbamoyloxy group; an alkoxycarbonyloxy group; an aryloxy-carbonyloxy group; an amino group substituted with an alkyl group, an aryl group or a heterocyclic group; an acylamino group, an ureido group; a sulfamoylamino group; an alkoxy-carbonylamino group; an aryloxycarbonylamino group; an alkyl- or aryl-sulfonylamino group; a heterocyclic sulfonylamino group; a nitro group; an alkyl- or aryl-thio group; a heterocyclic thio group; an alkyl- or aryl-sulfonyl group; a heterocyclic sulfonyl group; an alkyl- or aryl-sulfinyl group; a heterocyclic sulfinyl group; a sulfamoyl group; or a sulfo group. Each of these groups may be further substituted.

Of the substituents represented by G, a hydrogen atom; a halogen atom; an aliphatic group; an aromatic group; a hydroxyl group; an alkoxy group; an aryloxy group; an acyloxy group; a heterocyclic oxy group; an amino group substituted with an alkyl group, an aryl group or a heterocyclic group; an acylamino group; an ureido group; a sulfamoylamino group; an alkoxycarbonylamino group; an aryloxycarbonylamino group; an alkyl- or aryl-thio group; and a heterocyclic thio group are preferable, a hydrogen atom; a halogen atom; an alkyl group; a hydroxyl group; an alkoxy group; an aryloxy group; an acyloxy group; an amino group substituted with an alkyl group, an aryl group or a heterocyclic group; and an acylamino group are more preferable, and a hydrogen atom; an anilino group; and an acylamino group are especially preferable. Each of these groups may further have a substituent.

Of the substituents represented by $R_5$ and $R_6$, a hydrogen atom; an alkyl group; an aryl group; a halogen atom; an alkoxy-carbonyl group; a carboxyl group; a carbamoyl group; a hydroxyl group; an alkoxy group; and a cyano group are preferable. Each of these groups may further have a substituent. $R_5$ and $R_6$, $R_3$ and $R_5$, or $R_3$ and $R_4$ may be taken together to form a 5- or 6-membered ring.

In the general formulae (2) and (3), in the case where each of the substituents represented by A, $R_3$, $R_4$, $R_5$, $R_6$, and G further has a substituent, the substituents enumerated above for G, $R_5$, and $R_6$ can be enumerated as the substituent. Also, it is preferred to further have an ionic hydrophilic group as the substituent in any one of A, $R_3$, $R_4$, $R_5$, $R_6$, and G.

Examples of the ionic hydrophilic group as the substituent include a sulfo group, a carboxyl group, a phosphono group, and a quaternary ammonium group. As the foregoing ionic hydrophilic group, a carboxyl group, a phosphono group, and a sulfo group are preferable; and a carboxyl group and a sulfo group are especially preferable. Each of the carboxyl group, phosphono group and sulfo group may be in the state of a salt. Examples of a counter ion capable of forming the salt include an ammonium ion, an alkali metal ion (for example, a lithium ion, a sodium ion, and a potassium ion), and an organic cation (for example, a tetramethyl-ammonium ion, a tetramethylguanidium ion, and a tetramethylphosphonium ion).

The heterocyclic group of B is especially preferably a pyridine ring, and the general formula (2) is preferably represented by the following general formula (4).

Formula (4)

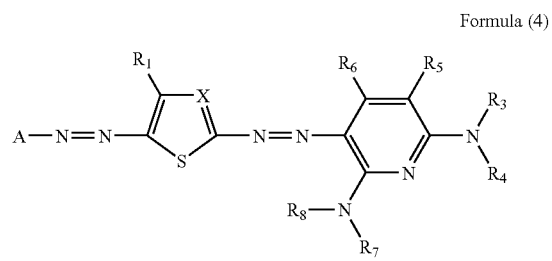

In the general formula (4), A, $R_1$, X, $R_3$, $R_4$, $R_5$ and $R_6$ are the same as A, $R_1$, X, $R_3$, $R_4$, $R_5$ and $R_6$ in the general formula (2), and $R_7$ and $R_8$ are the same as $R_3$ and $R_4$ in the general formula (4).

In the general formula (4), $R_3$ and $R_4$ each preferably represents a hydrogen atom, an alkyl group, an aryl group, a heterocyclic group, a sulfonyl group, or an acyl group; more preferably a hydrogen atom, an aryl group, a heterocyclic group, or a sulfonyl group; and most preferably a hydrogen atom, an aryl group, or a heterocyclic group. However, $R_3$ and $R_4$ do not represent a hydrogen atom at the same time.

In the invention, among the azo dyes represented by the general formula (4), especially preferred structures are ones represented by the following general formula (5).

Formula (5)

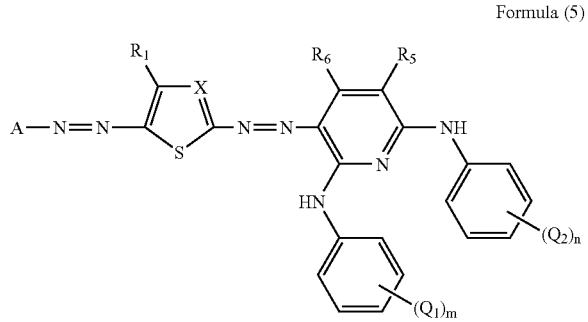

In the formula, A, $R_1$, X, $R_5$, and $R_6$ are the same as A, $R_1$, X, $R_5$, and $R_6$ in the general formula (4); $Q_1$ and $Q_2$ each independently represents an ionic hydrophilic group, and especially preferably a sulfo group or a carboxyl group; and m and n each independently represents an integer of from 1 to 3. A preferably represents a monovalent aromatic ring, and especially preferably a phenyl group or a naphthyl group. In the case where X represents —$CR_2$=, $R_2$ represents an electron withdrawing group, and especially preferably a cyano group. $R_5$ and $R_6$ each represents a hydrogen atom, an alkyl group, an aryl group, a halogen atom, an alkoxycarbonyl group, a carboxyl group, a carbamoyl group, a hydroxyl group, an alkoxy group, or a cyano group.

Each of the groups described in the general formula (5) may further have a substituent. In the case where each of these groups further has a substituent, examples of the substituent include the substituents described in the general formulae (2) and (3), the groups enumerated for G, $R_5$ and $R_6$, and an ionic hydrophilic group.

Specific examples of the azo dye represented by the foregoing general formula (1) will be given below, but it should not be construed that the azo dye to be used in the invention is limited to the following examples. Also, each of the carboxyl group, phosphono group and sulfo group may be in the state of a salt. Examples of a counter ion capable of forming the salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion).

TABLE 1

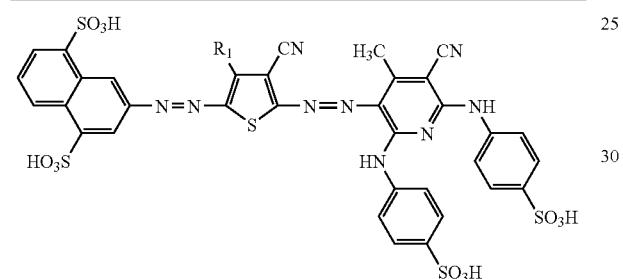

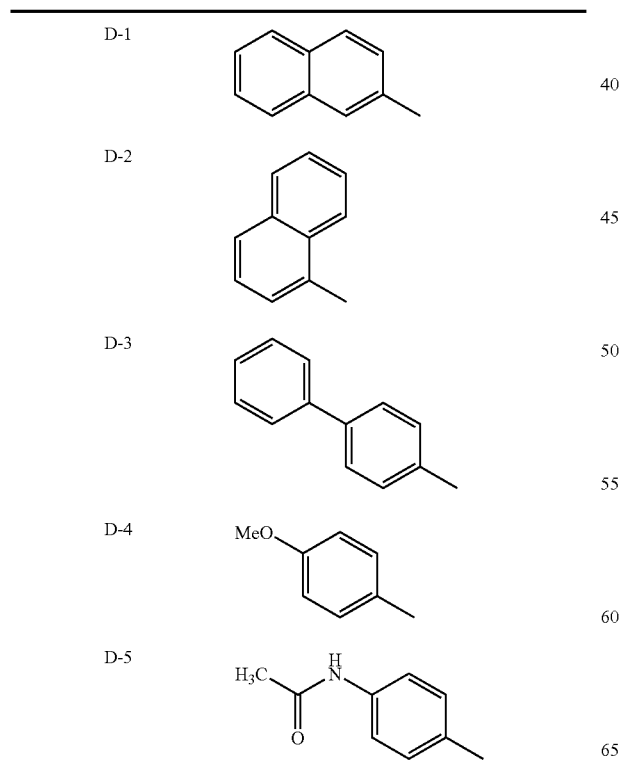

TABLE 1-continued

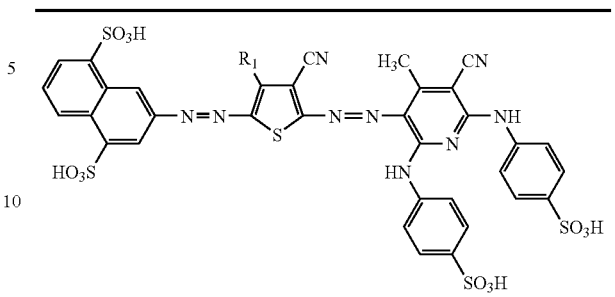

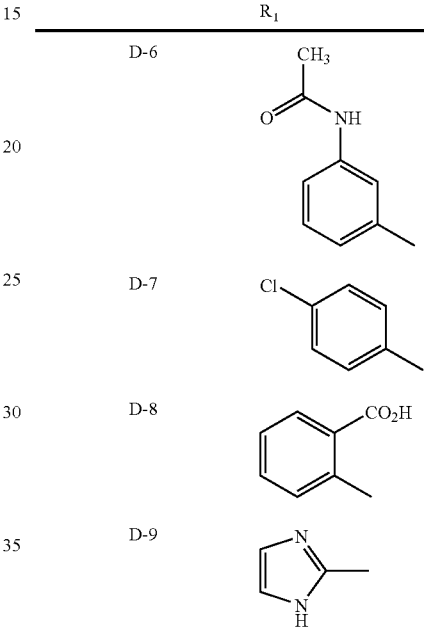

TABLE 2

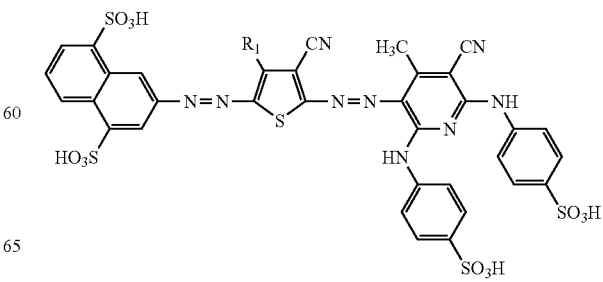

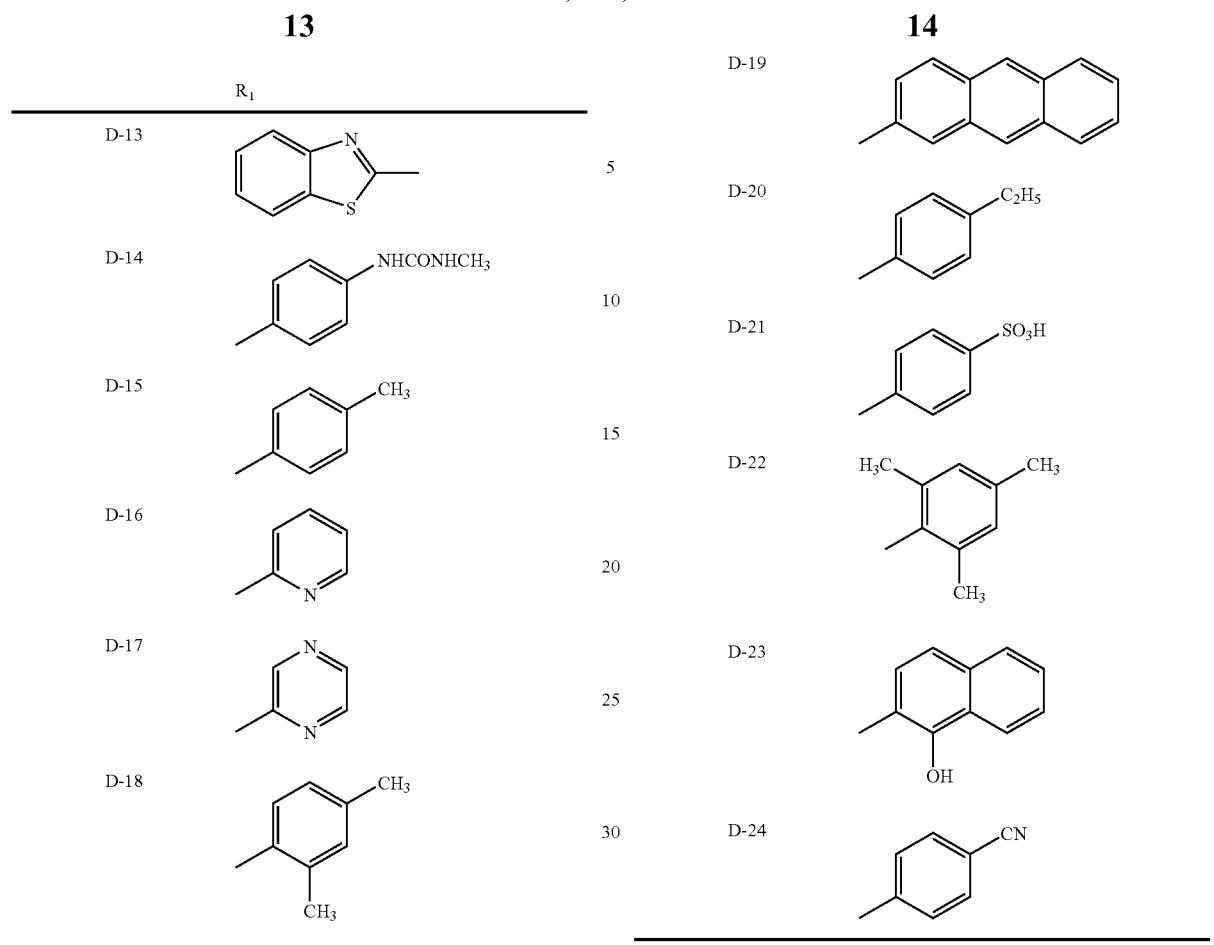
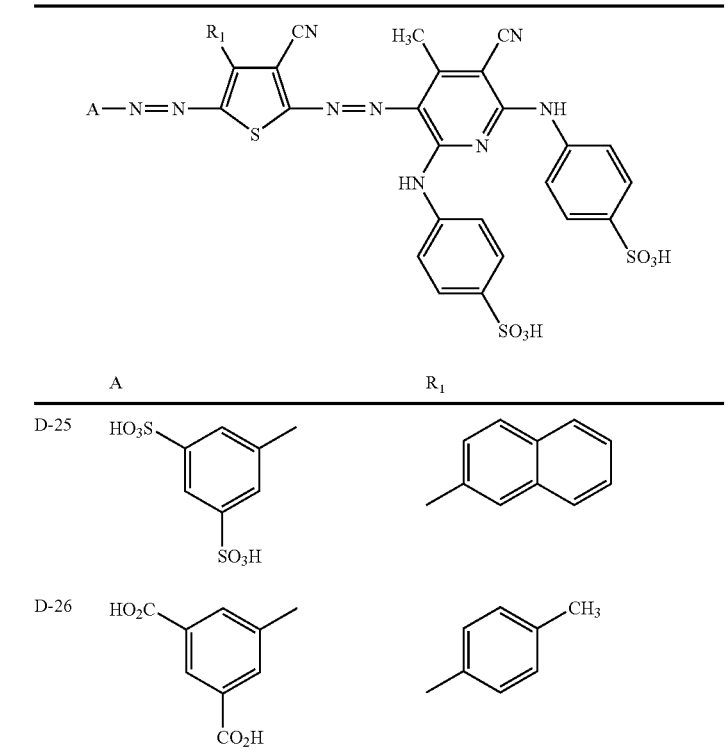
TABLE 3

TABLE 3-continued
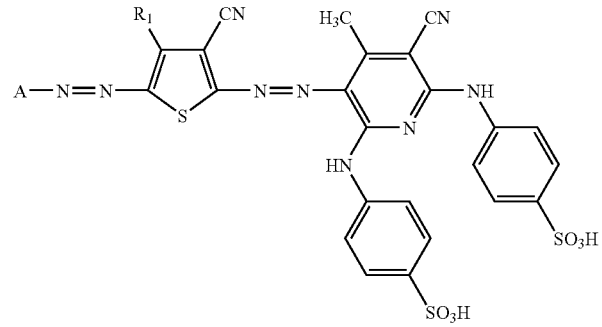
| | A | R₁ |
|---|---|---|
| D-27 | 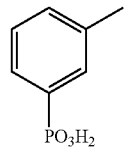 | 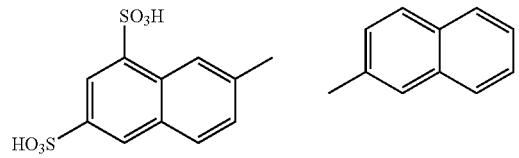 |
| D-28 | 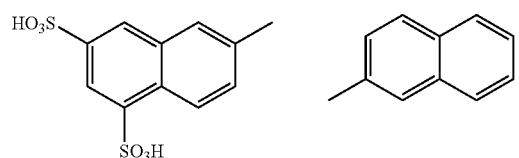 | 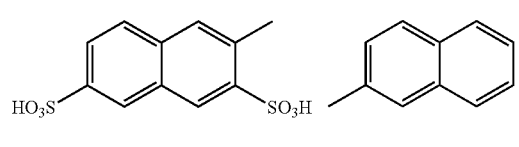 |
| D-29 | 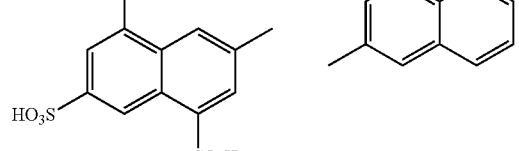 | 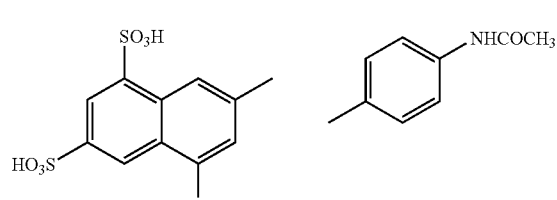 |
| D-30 | (naphthalene with HO₃S, SO₃H substituents) | (methylnaphthalene) |
| D-31 | (naphthalene with SO₃H, HO₃S, SO₃H substituents) | (methylnaphthalene) |
| D-32 | (naphthalene with SO₃H, HO₃S, SO₃H substituents) | (methylphenyl-NHCOCH₃) |

TABLE 4

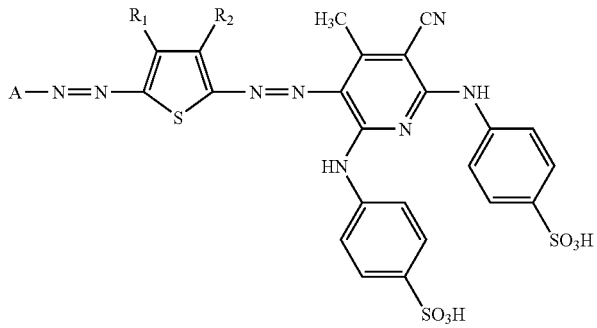

| A | R₁ | R₂ |
|---|---|---|
| D-33 (3,5-disulfo-biphenyl-4'-yl-methyl-4-methylphenyl group with HO₃S groups) | 4-methylphenyl | —SO₂CH₃ |
| D-34 (6-methyl-naphthalene-1,3-disulfonic acid) | 3-methylnaphthyl | —CONH₂ |
| D-35 (4,5-dicyano-2-methyl-imidazole) | 4-(NHCOCH₃)phenyl | —CO₂Me |
| D-36 (3,5-dimethyl-4-cyano-pyrazole) | 4-methylphenyl | —CO₂H |
| D-37 (2-methyl-3-cyano-5-sulfophenyl) | 4-methoxyphenyl | —SO₂NHCH₃ |
| D-38 (6-methyl-naphthalene-1,3-disulfonic acid) | 1-methylnaphthyl | —CF₃ |
| D-39 (6-methyl-naphthalene-1,5-disulfonic acid) | 3-methylnaphthyl | 3,5-bis(trifluoromethyl)phenyl |

TABLE 4-continued
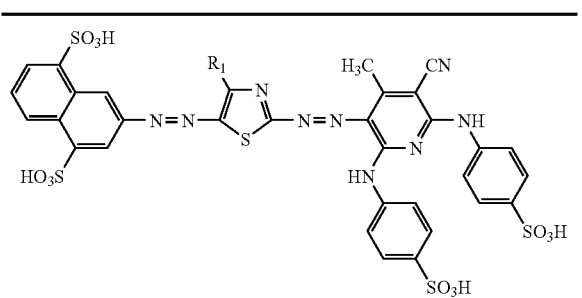
| | A | $R_1$ | $R_2$ |
|---|---|---|---|
| D-40 | 2-methyl-1,4-benzenedisulfonic acid | 4-methylphenyl | —CON(CH$_3$)$_2$ |
TABLE 5 / TABLE 5-continued
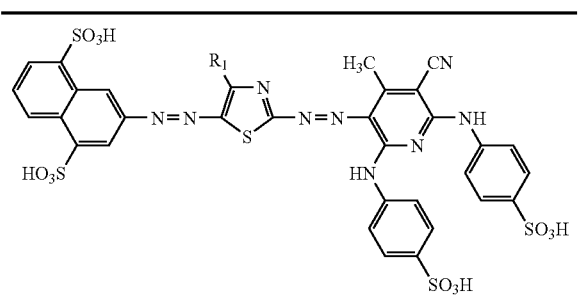
| | $R_1$ |
|---|---|
| D-41 | 2-naphthyl |
| D-42 | 1-naphthyl |
| D-43 | 4-biphenylyl |
| D-44 | 4-methoxyphenyl |
| D-45 | 4-acetamidophenyl |
| D-46 | phenyl |
| D-47 | 4-chlorophenyl |
| D-48 | 4-methylphenyl |
| D-49 | 4-(3-methylureido)phenyl |

TABLE 5-continued

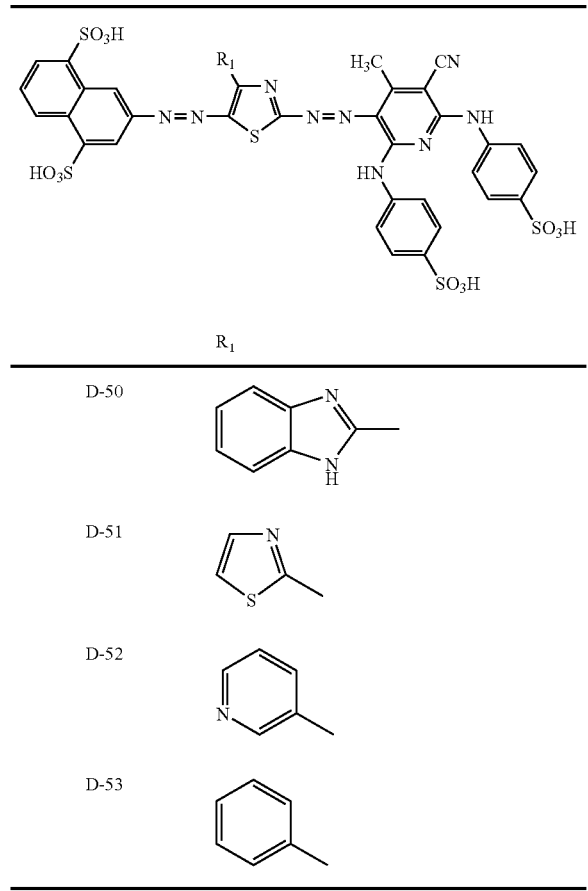

TABLE 6

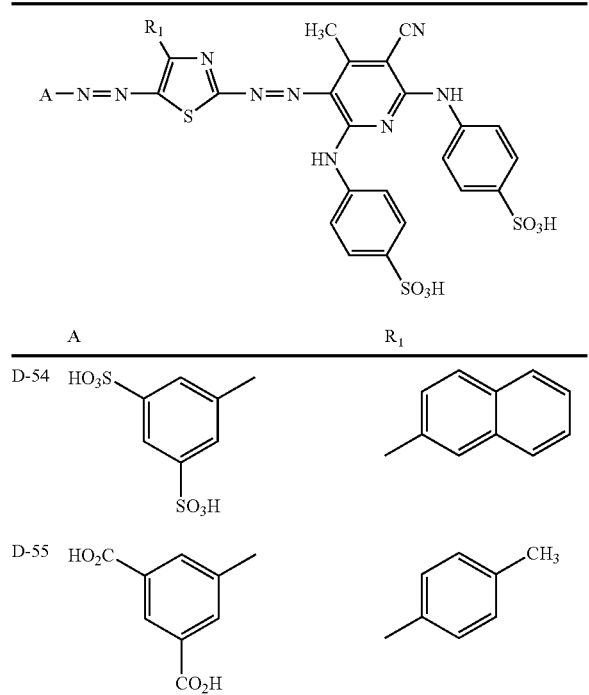
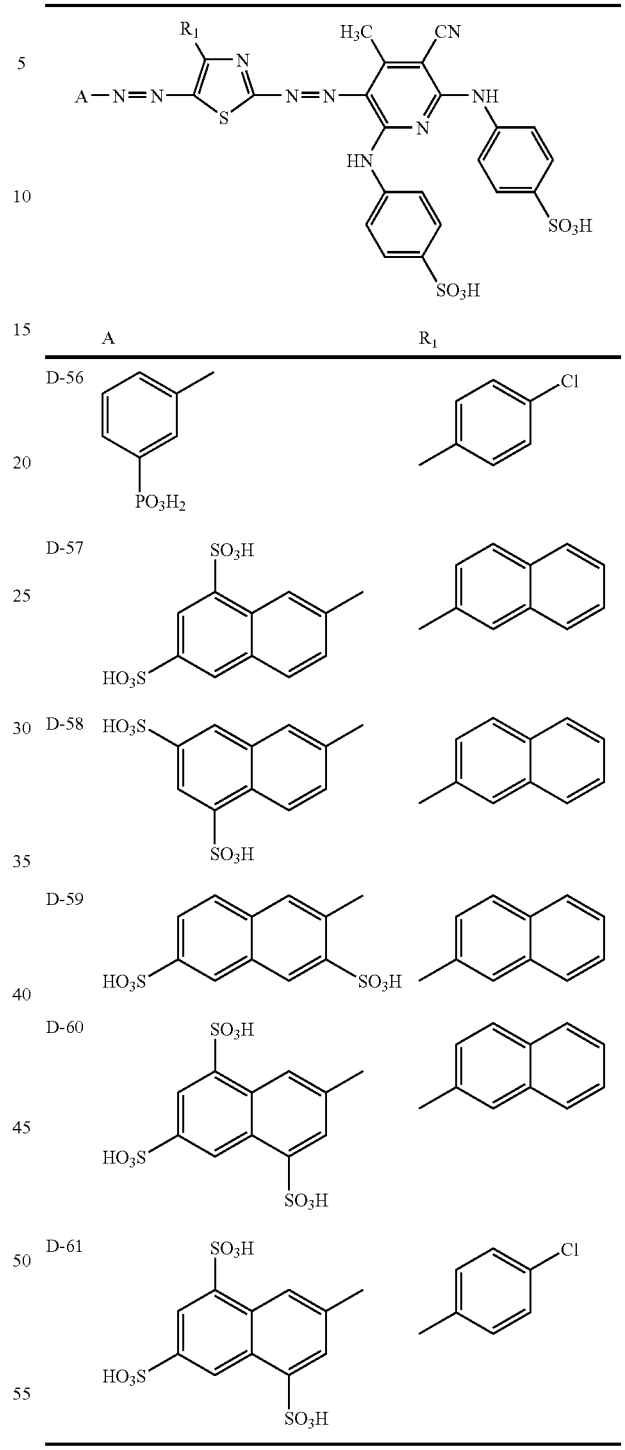

The dyes represented by the foregoing general formulae (1), (2), (4) and (5) can be synthesized by coupling reaction of a diazo component and a coupler (see, for example, JP-A-2003-306623).

In the ink for inkjet recording of the invention, the desired effect is revealed by jointly using the azo dye represented by the foregoing general formula (1) and other dye or by jointly using a plurality of the azo dyes represented by the foregoing general formula (1). Though an ink for inkjet recording containing two or more kinds of the azo dyes represented by the general formula (1) is preferable, in the case where the azo dye represented by the general formula (1) is jointly used with other dye, any dye may be used as the other dye. However, dyes in which the λmax is present at from 500 nm to 700 nm and in an absorption spectrum of a dilute solution regulated so as to have an absorbance of 1.0, the half band width is 100 nm or more are preferable. Examples thereof include ones represented by the following general formulae (7) to (10).

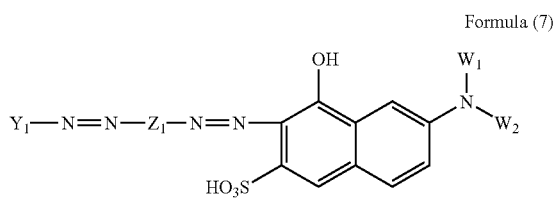

Formula (7)

In the general formula (7), $Y_1$ and $Z_1$ each independently represents a substituted or unsubstituted aromatic group; or a substituted or unsubstituted heterocyclic group ($Y_1$ represents a monovalent group, and $Z_1$ represents a divalent group), and $W_1$ and $W_2$ each independently represents a hydrogen atom or a substituent.

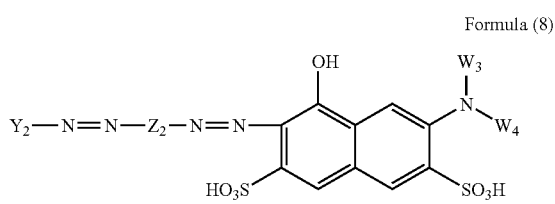

Formula (8)

In the general formula (8), $Y_2$ and $Z_2$ each independently represents a substituted or unsubstituted aromatic group; or a substituted or unsubstituted heterocyclic group ($Y_2$ represents a monovalent group, and $Z_2$ represents a divalent group), and $W_3$ and $W_4$ each independently represents a hydrogen atom or a substituent.

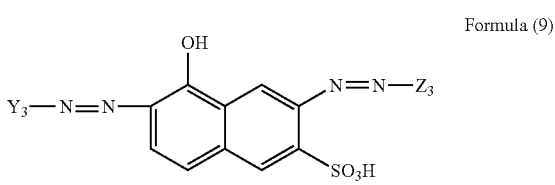

Formula (9)

In the general formula (9), $Y_3$ and $Z_3$ each independently represents a substituted or unsubstituted aromatic group; or a substituted or unsubstituted heterocyclic group ($Y_3$ and $Z_3$ each represents a monovalent group).

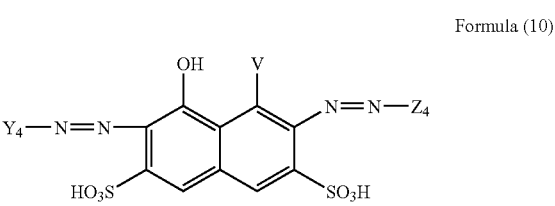

Formula (10)

In the general formula (10), V represents —OH or —$NH_2$; and $Y_4$ and $Z_4$ each independently represents a substituted or unsubstituted aromatic group; or a substituted or un-substituted heterocyclic group ($Y_4$ and $Z_4$ each represents a monovalent group).

Next, the general formulae (7), (8), (9) and (10) will be described below.

In the general formula (7), $Y_1$ and $Z_1$ each independently represents a substituted or unsubstituted aromatic group ($Y_1$ represents a monovalent aromatic group such as an aryl group; and $Z_1$ represents a divalent aromatic group such as an arylene group); or a substituted or unsubstituted heterocyclic group ($Y_1$ represents a monovalent heterocyclic group, and $Z_1$ represents a divalent heterocyclic group). Examples of the aromatic ring include a benzene ring and a naphthalene ring; and examples of the hetero atom of the heterocycle include N, O, and S. The heterocycle may be fused with an aliphatic ring, an aromatic ring, or other heterocycle. Examples of the substituents of $Y_1$ and $Z_1$ include the substituents enumerated for G of the general formula (2), an arylazo group, and a heterocyclic azo group.

$W_1$ and $W_2$ each independently represents a hydrogen atom or a substituent. Examples of the substituents of $W_1$ and $W_2$ include the substituents enumerated for G of the general formula (2).

In the general formula (8), $Y_2$ and $Z_2$ each independently represents a substituted or unsubstituted aromatic group ($Y_2$ represents a monovalent aromatic group such as an aryl group; and $Z_2$ represents a divalent aromatic group such as an arylene group); or a substituted or unsubstituted heterocyclic group ($Y_2$ represents a monovalent heterocyclic group, and $Z_2$ represents a divalent heterocyclic group). Examples of the aromatic ring include a benzene ring and a naphthalene ring; and examples of the hetero atom of the heterocycle include N, O, and S. The heterocycle may be fused with an aliphatic ring, an aromatic ring, or other heterocycle. Examples of the substituents of $Y_2$ and $Z_2$ include the substituents enumerated for G of the general formula (2), an arylazo group, and a heterocyclic azo group.

$W_3$ and $W_4$ each independently represents a hydrogen atom or a substituent. Examples of the substituents of $W_3$ and $W_4$ include the substituents enumerated for G of the general formula (2).

In the general formula (9), $Y_3$ and $Z_3$ each independently represents a substituted or unsubstituted aromatic group ($Y_3$ and $Z_3$ each represents a monovalent aromatic group such as an aryl group); or a substituted or unsubstituted heterocyclic group ($Y_3$ and $Z_3$ each represents a monovalent heterocyclic group). Examples of the aromatic ring include a benzene ring and a naphthalene ring; and examples of the hetero atom of the heterocycle include N, O, and S. The heterocycle may be fused with an aliphatic ring, an aromatic ring, or other heterocycle. Examples of the substituents of $Y_3$ and $Z_3$ include the substituents enumerated for G of the general formula (2), an arylazo group, and a heterocyclic azo group.

In the general formula (10), V represents —OH or —$NH_2$; and $Y_4$ and $Z_4$ each independently represents a substituted or unsubstituted aromatic group ($Y_4$ and $Z_4$ each represents a monovalent aromatic group such as an aryl group); or a substituted or unsubstituted heterocyclic group ($Y_4$ and $Z_4$ each represents a monovalent heterocyclic group). Examples of the aromatic ring include a benzene ring and a naphthalene ring; and examples of the hetero atom of the heterocycle include N, O, and S. The heterocycle may be fused with an aliphatic ring, an aromatic ring, or other heterocycle. Examples of the substituents of $Y_4$ and $Z_4$ include the substituents enumerated for G of the general formula (2), an arylazo group, and a heterocyclic azo group.

Also, in the general formulae (7) to (10), each of the carboxyl group, phosphono group and sulfo group may be in the state of a salt. Examples of a counter ion capable of forming the salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion) Also, the azo dyes represented by the general formulae (7) to (10) may form a chelate complex together with a metal.

Specific examples of the azo dyes represented by the foregoing general formulae (7) to (10) will be given below, but it should not be construed that the azo dye of the invention is limited thereto.

(E-1)
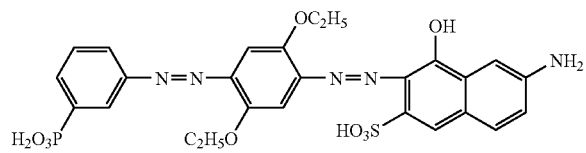

(E-2)
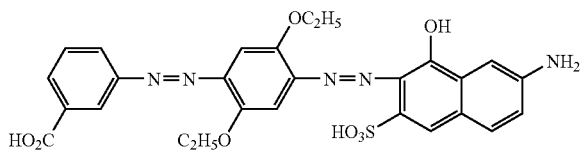

(E-3)
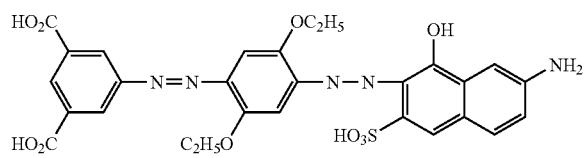

(E-4)
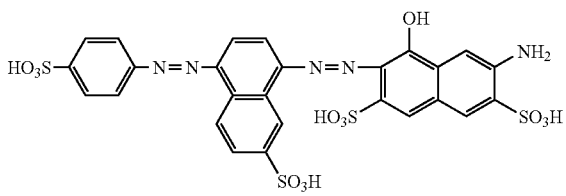

(E-5)
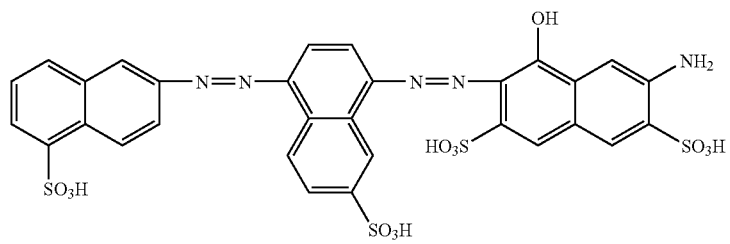

(E-6)
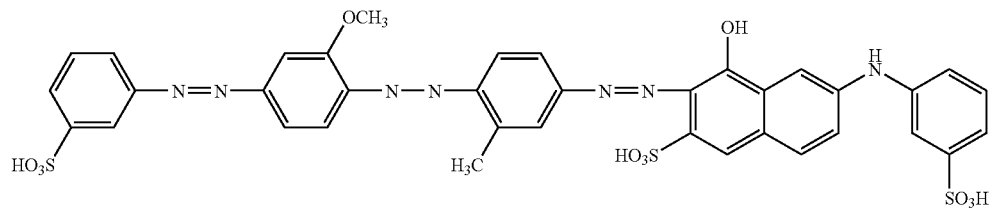

(E-7)
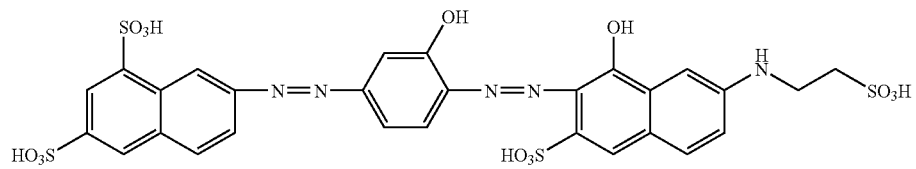

(E-8)
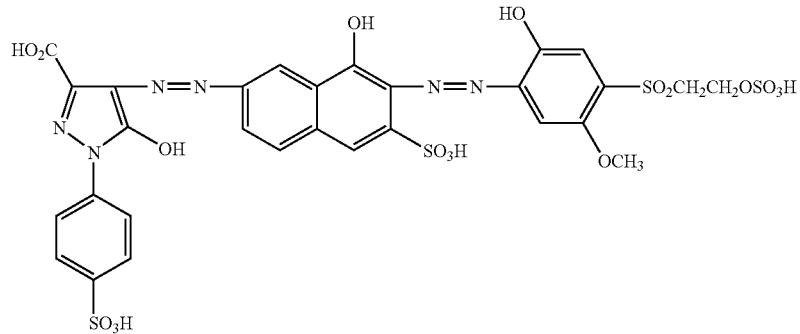

-continued

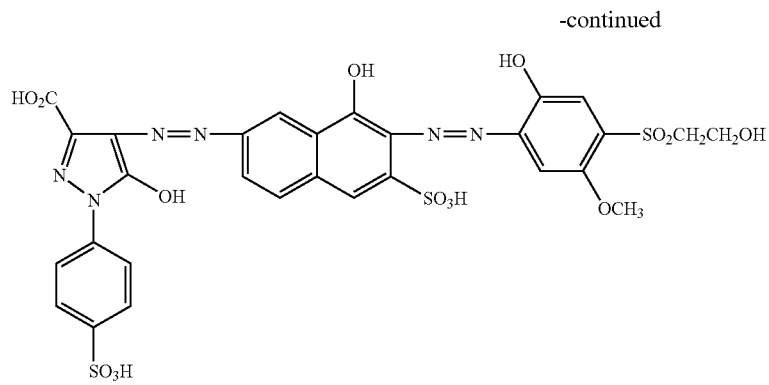

(E-9)

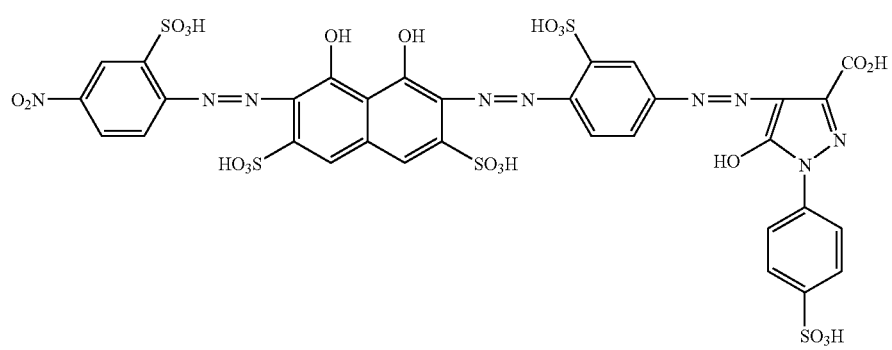

(E-10)

Incidentally, a mixing ratio of the azo dye represented by the general formula (1) and the dye to be used jointly is arbitrary and is not particularly limited. The mixing ratio is preferably from 1/100 to 100/1, and more preferably from 1/10 to 10/1 in terms of molar ratio.

The aqueous ink of the invention is an ink comprising the foregoing azo dye dissolved or dispersed in an aqueous medium, and preferably an ink comprising the foregoing azo dye dissolved in an aqueous medium. With respect to the aqueous medium, the following item of ink for inkjet recording can be made hereof by reference.

Ink for Inkjet Recording

The ink for inkjet recording can be prepared by dissolving and/or dispersing the foregoing azo dye in a lipophilic medium or an aqueous medium. The case of using an aqueous medium is preferable. If desired, other additives are contained within the range where the effect of the invention is not hindered. Examples of other additives include known additives such as a drying preventive agent (wetting agent), a fading preventive agent, an emulsion stabilizer, a penetration accelerator, an ultraviolet light absorber, an antiseptic, a mildewproofing agent, a pH modifier, a surface tension modifier, a defoaming agent, a viscosity modifier, a dispersant, a dispersion stabilizer, a rust-proofing agent, and a chelating agent (ones described in JP-A-2003-306623 are applicable). In the case of an aqueous ink, these various additives are added directly to the ink liquid. In the case where an oil-soluble dye is used in the form of a dispersion, it is general to add the additives to the dispersion after preparing the dye dispersion, but the additives may be added to the oil phase or aqueous phase at the time of preparation.

It is preferable that the foregoing azo dye is contained in an amount of from 0.2 parts by weight to 30 parts by weight in 100 parts by weight of the ink of the invention. Also, in the ink for inkjet recording of the invention, other colorant (for example, dyes and/or pigments described in JP-A-2003-306623) may be used jointly with the foregoing azo dye. In the case where two or more kinds of colorants are used jointly, it is preferable that the total sum of the contents of the colorants falls within the foregoing range.

The ink for inkjet recording of the invention can be used for not only the formation of monochromatic images but also the formation of full color images. For forming full color images, a magenta tone ink, a cyan tone ink, and a yellow tone ink can be used.

Inkjet Recording Method

For the inkjet recording method using the ink of the invention, a method described in JP-A-2003-306623 can be applied.

EXAMPLES

The invention will be described below with reference to the following Examples, but it should not be construed that the invention is limited thereto.

Example 1

Ultra-pure water (value of resistance: 18 MΩ or more) and a base were added to the following components to make the total to one liter, and the mixture was then stirred for one hour while heating at 30 to 40° C. Thereafter, the resulting mixture was filtered in vacuo by a microfilter having a mean pore size of 0.25 μm, to prepare a black ink liquid Bk-101.

| Formulation of black ink Bk-101 | |
|---|---|
| Solids | |
| Black dyes (D-1) and (D-41) of the invention: | 60 g/L |
| Proxel: | 5 g/L |
| Urea: | 20 g/L |
| Benzotriazole: | 3 g/L |
| Liquid components | |
| Diethylene glycol monobutyl ether (DGB): | 100 g/L |
| Glycerin (GR): | 125 g/L |
| Diethylene glycol (DEG): | 100 g/L |
| 2-Pyrrolidone (PRD): | 30 g/L |
| Triethanolamine (TEA): | 5 g/L |
| Surfynol STG (SW): | 10 g/L |

Next, black inks Bk-102 to Bk-110 having the same composition were prepared, except for changing the dye and base in the ink formulation as shown in Table 7. In the case of changing the dye, the dye was used such that the addition amount of the dye was equimolar to the ink liquid Bk-101. In the case of using two or more kinds of dyes, equimolar amounts of the dyes were used.

TABLE 7

| Ink liquid | Dye | Base | pH of ink |
|---|---|---|---|
| Bk-101 | D-1 and D-41 | TEA 5 g/L | 8.1 |
| Bk-102 | D-1 and D-48 | TEA 5 g/L | 8.1 |
| Bk-103 | D-41 and E-3 | TEA 5 g/L | 8.1 |
| Bk-104 | Comparative Dye 1 | TEA 5 g/L | 8.1 |
| Bk-105 | Comparative Dye 2 | TEA 5 g/L | 8.1 |
| Bk-106 | Comparative Dye 3 | TEA 5 g/L | 8.1 |
| Bk-107 | D-1 and D-41 | LiOH 2 g/L | 8.2 |
| Bk-108 | Comparative Dye 3 | LiOH 2 g/L | 8.2 |
| Bk-109 | D-1 and D-41 | NaOH 2 g/L | 8.2 |
| Bk-110 | Comparative Dye 3 | NaOH 2 g/L | 8.2 |

Each of the inks was charged in a cartridge of black ink of an inkjet printer PM-980C, manufactured by Seiko Epson Corporation, and an image pattern where the gray density stepwise changed was printed. An image was printed on inkjet paper photo glossy paper "GASAI", manufactured by Fuji Photo Film Co., Ltd. as an image-receiving sheet and evaluated with respect to hue, water resistance and image fastness.

Evaluation Tests

1) With respect to the hue, a broad hue in the vicinity of 590 nm of λmax was visually evaluated according to three grades of "best", "good" and "poor". The evaluation results are shown in the following table. In the following table, A means that the hue was the best; B means that the hue was good; and C means that the hue was poor.
2) With respect to the printing density, the density immediately after printing was measured using a densitometer X-rite 310. The printing density was evaluated according to three grades, in which A means that the printing density was 2.5 or more; B means that the printing density was from more than 2.3 to less than 2.5; and C means that the printing density was 2.3 or less.
3) With respect to the image preservability of the black image, the following evaluation was achieved using a gray printed sample. The evaluation of the image preservability was carried out by measuring a density of the gray stepwise pattern by a densitometer X-rite 310 mounted with a status A filter and measuring a change of the density while defining a point in the vicinity of Dvis=1.0 as the reference point.

With respect to the light fastness, a density (Dvis) Ci of a pattern S immediately after printing was measured, and the image was then irradiated with xenon light (85,000 lux) using a weather meter manufactured by Atlas. Thereafter, a density Cf of the pattern S was again measured, and a retention rate of dye (Cf/Ci×100) was determined, thereby achieving the evaluation. The case where the retention rate of dye was 80% or more was defined as A; the case where the retention rate of dye was from 70 to 80% was defined as B; and the case where the retention rate of dye was less than 70% was defined as C.

With respect to the heat fastness, a density of a pattern S was measured by a densitometer X-rite 310 before and after preserving a sample for 21 days under a condition at 80° C. and 70% RH, and a retention rate of dye was determined, thereby achieving the evaluation. The case where the retention rate of dye was 90% or more was defined as A; the case where the retention rate of dye was from 80 to 90% was defined as B; and the case where the retention rate of dye was less than 80% was defined as C.

With respect to the ozone resistance ($O_3$ fastness), a sample was allowed to stand for 96 hours within a box wherein the ozone gas concentration was set up at 5 ppm, a density of a pattern S was measured by a densitometer X-rite 310 before and after allowing to stand under the ozone gas, and a retention rate of dye was determined, thereby achieving the evaluation. The ozone gas concentration within the box was set up using an ozone gas monitor manufactured by APPLICS (model: OZG-EM-01). The case where the retention rate of dye was 80% or more was defined as A; the case where the retention rate of dye was from 70 to 80% was defined as B; and the case where the retention rate of dye was less than 70% was defined as C.

The results obtained are shown in Table 8.

TABLE 8

| No. | Hue | Printing density | Light fastness | Heat fastness | $O_3$ fastness |
|---|---|---|---|---|---|
| Bk-101 (Invention) | A | A | A | A | A |
| Bk-102 (Invention) | A | A | A | A | A |
| Bk-103 (Invention) | A | A | A | A | A |
| Bk-104 (Comparison) | A | B | B | A | C |
| Bk-105 (Comparison) | A | B | B | A | C |
| Bk-106 (Comparison) | A | B | B | A | C |
| Bk-107 (Invention) | A | A | A | A | A |
| Bk-108 (Comparison) | A | B | B | A | C |
| Bk-109 (Invention) | A | A | A | A | A |
| Bk-110 (Comparison) | A | B | B | A | C |

Comparative Dye 1

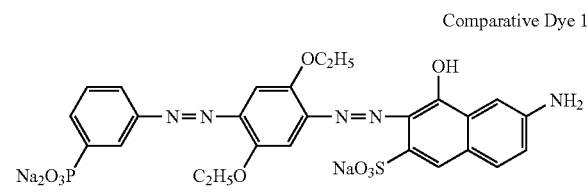

-continued

Comparative Dye 2

[Chemical structure: NaO₂C-phenyl-N=N-(OC₂H₅, C₂H₅O substituted phenyl)-N=N-(OH, NaO₃S substituted naphthyl)-NH₂]

Comparative Dye 3

[Chemical structure: (NaO₂C, NaO₂C substituted phenyl)-N=N-naphthyl-N=N-(OH, NaO₃S substituted naphthyl)-NH₂]

As shown in the results of Table 8, the images (hues) obtained from the ink liquids of the invention were clearer than the images obtained from the comparative ink liquids. Also, the images obtained using the inks of the invention were excellent with respect to the printing density, light fastness, light fastness and ozone gas resistance.

Further, using each of the ink liquids Bk-101 to Bk-110, an image was recorded on superfine-exclusive glossy paper (MJA4S3P, manufactured by Seiko Epson Corporation) by an inkjet printer (PM-980C, manufactured by Seiko Epson Corporation). The resulting images were evaluated with respect to the hue, printing density and fastness. As a result, similar results to those in Table 8 were obtained in all of the evaluation items.

Example 2

Using each of the same inks prepared in Example 1, an image was printed on inkjet paper photo glossy paper EX, manufactured by Fuji Photo Film Co., Ltd. by the same device as in Example 1 and then evaluated in the same manners as in Example 1. As a result, similar results to those in Example 1 were obtained.

Example 3

Each of the same inks prepared in Example 1 was filled in a cartridge of an inkjet printer BJ-F850 (manufactured by Canon Inc.), and an image was printed in photo grassy paper GP-301, manufactured by Canon Inc. by this device and then evaluated in the same manners as in Example 1. As a result, similar results to those in Example 1 were obtained.

The aqueous ink of the invention can give colored images and colored materials having good hue, excellent fastness, and high printing density. In particular, according to the ink for inkjet recording and inkjet recording method using the aqueous ink of the invention, it is possible to form a black image having good hue, excellent fastness to light and active gases in the circumstance, particularly an ozone gas, and high printing density.

The entire disclosure of each and every foreign patent application from which the benefit of foreign priority has been claimed in the present application is incorporated herein by reference, as if fully set forth.

What is claimed is:

1. An aqueous ink comprising at least a first dye and a second dye each having at least one ionic hydrophilic group in a molecule thereof, wherein at least the first dye includes an azo dye represented by formula (1):

Formula (1)

[Chemical structure: A-N=N-(thiazole ring with $R_1$ and X)-N=N-B]

wherein A and B each independently represents a substituted or unsubstituted monovalent aromatic group; or a substituted or unsubstituted monovalent heterocyclic group;

$R_1$ represents a substituted phenyl group; or a substituted or unsubstituted naphthyl group; or a substituted or unsubstituted heterocyclic group; and X represents $-CR_2=$ or a nitrogen atom, and when X represents $-CR_2=$, $R_2$ represents a hydrogen atom or a substituent, and wherein the second dye is a dye in which a λmax is present at from 500 to 700 nm and in an absorption spectrum of a dilute solution regulated so as to have an absorbance of 1.0, a half band width is 100 nm.

2. An aqueous ink comprising at least a first dye and a second dye each having at least one ionic hydrophilic group in a molecule thereof, wherein at least the first dye includes an azo dye represented by formula (1):

Formula (1)

[Chemical structure: A-N=N-(thiazole ring with $R_1$ and X)-N=N-B]

wherein A represents a substituted or unsubstituted monovalent aromatic group, or a substituted or unsubstituted monovalent heterocyclic group, and B represents a substituted or unsubstituted heterocyclic group;

$R_1$ represents a substituted phenyl group;

or a substituted or unsubstituted naphthyl group; or a substituted or unsubstituted heterocyclic group; and X represents $-CR_2=$ or a nitrogen atom, and when X represents $-CR_2=$, $R_2$ represents a hydrogen atom or a substituent, and wherein the second dye is a dye in which a λmax is present at from 500 to 700 nm and in an absorption spectrum of a dilute solution regulated so as to have an absorbance of 1.0, a half band width is 100 nm.

3. An aqueous ink comprising at least a first dye and a second dye each having at least one ionic hydrophilic group in a molecule thereof, wherein at least the first dye includes an azo dye represented by formula (2):

Formula (2)

[Chemical structure: A-N=N-(thiazole ring with $R_1$ and X)-N=N-(pyridine ring with $B_1$, $B_2$, G)-N($R_3$)($R_4$)]

wherein A represents a substituted or unsubstituted monovalent aromatic group; or a substituted or unsubstituted monovalent heterocyclic group;

R₁ represents a substituted phenyl group; or a substituted or unsubstituted naphthyl group; or a substituted or unsubstituted heterocyclic group; and X represents —CR₂= or a nitrogen atom, and when X represents —CR₂=, R₂ represents a hydrogen atom or a substituent;

B₁ and B₂ each independently represents =CR₅_ or —CR₆=, or either one of them represents a nitrogen atom and the other represents =CR₅_ or —CR₆=; and G, R₃, R₄, R₅ and R₆ each independently represents a hydrogen atom or a substituent, and wherein the second dye is a dye in which a λmax is present at from 500 to 700 nm and in an absorption spectrum of a dilute solution regulated so as to have an absorbance of 1.0, a half band width is 100 nm.

4. The aqueous ink according to claim 3,
wherein R₃ and R₄ each independently represents a hydrogen atom; an aliphatic group; an aromatic group; a heterocyclic group; an acyl group; an alkoxycarbonyl group; an aryloxycarbonyl group; a carbamoyl group; an alkyl- or aryl- sulfonyl group; or a sulfamoyl group, and R₃ and R₄ do not represent a hydrogen atom at the same time;

G, R₅, and R₆ each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; a heterocyclic oxycarbonyl group; an acyl group; a hydroxyl group; an alkoxy group; an aryloxy group; a heterocyclic oxy group; a silyloxy group; an acyloxy group; a carbamoyloxy group; an alkoxycarbonyloxy group; an aryloxycarbonyloxy group; an amino group substituted with an alkyl group, an aryl group or a heterocyclic group; an acylamino group, an ureido group; a sulfamoylamino group; an alkoxycarbonylamino group; an aryloxycarbonylamino group; an alkyl- or aryl- sulfonylamino group; a heterocyclic sulfonylamino group; a nitro group; an alkyl- or aryl- thio group; a heterocyclic thio group; an alkyl- or aryl- sulfonyl group; a heterocyclic sulfonyl group; an alkyl- or aryl- sulfinyl group; a heterocyclic sulfinyl group; a sulfamoyl group; or a sulfo group;

each of these groups may be substituted; and
R₅ and R₆, R₃ and R₅, or R₃ and R₄ may be taken together to form a 5- or 6-membered ring.

5. The aqueous ink according to claim 4,
wherein the azo dye is represented by formula (4):

Formula (4)

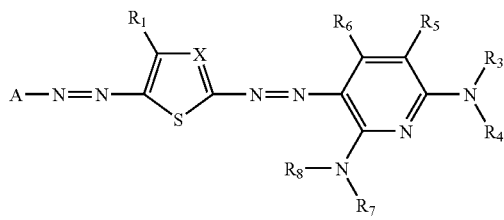

wherein A, R₁, X, R₃, R₄, R₅ and R₆ are the same as A, R₁, X, R₃, R₄, R₅ and R₆ in formula (2); and
R₇ and R₈ are the same as R₃ and R₄ in formula (4).

6. The aqueous ink according to claim 5,
wherein the azo dye is represented by formula (5):

Formula (5)

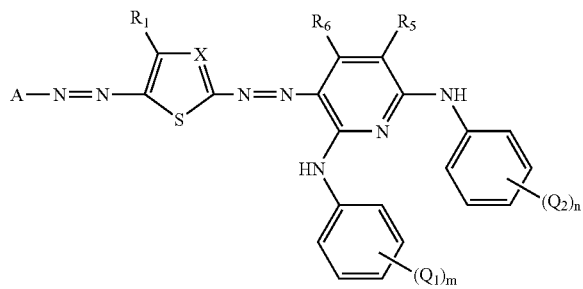

wherein A, R₁, X, R₅ and R₆ are the same as A, R₁, X, R₅ and R₆ in formula (4);
Q₁ and Q₂ each independently represents an ionic hydrophilic group;
m and n each independently represents an integer of from 1 to 3; and
each of these groups may be substituted.

7. The aqueous ink according to claim 1,
wherein each of said at least two dyes independently includes an azo dye represented by formula (1).

8. The aqueous ink according to claim 3,
wherein each of said at least two dyes independently includes an azo dye represented by formula (2).

9. An ink for inkjet recording comprising an aqueous ink according to claim 1.

10. An inkjet recording method comprising forming an image with an ink for inkjet recording according to claim 9.

11. An aqueous ink comprising at least a first dye and a second dye each having at least one ionic hydrophilic group in a molecule thereof, wherein at least the first dye includes an azo dye represented by formula (1):

Formula (1)

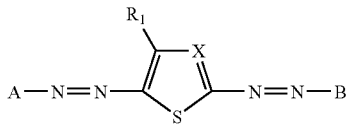

wherein A and B each independently represents a substituted or unsubstituted monovalent aromatic group; or a substituted or unsubstituted monovalent heterocyclic group;

R₁ represents a substituted phenyl group; or a substituted or unsubstituted naphthyl group; or a substituted or unsubstituted heterocyclic group; and X represents —CR₂= or a nitrogen atom, and when X represents —CR₂=, R2 represents a hydrogen atom or a substituent, and wherein the second dye is a dye in which a λmax is present at from 500 to 700 nm and in an absorption spectrum of a dilute solution regulated so as to have an absorbance of 1.0, a half band width is 100 nm, and wherein the second dye is a dye represented by one of the following formulas:

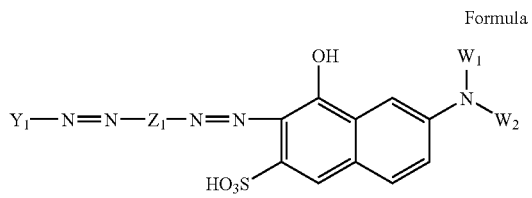

Formula (7)

wherein in the formula (7), $Y_1$ represents a monovalent group, $Z_1$ represents a divalent group, and $W_1$ and $W_2$ each independently represents a hydrogen atom or a substituent;

Formula (8)

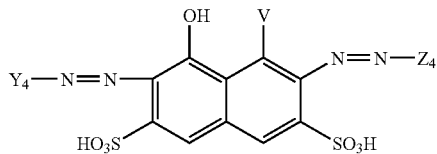

wherein in the formula (8), $Y_2$ represents a monovalent group, $Z_2$ represents a divalent group, and $W_3$ and $W_4$ each independently represents a hydrogen atom or a substituent;

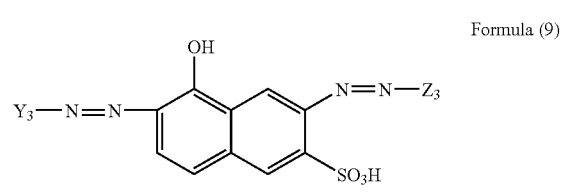

Formula (9)

wherein in the formula (9), $Y_3$ and $Z_3$ each represents a monovalent group; or Formula (10)

wherein in the formula (10), V represents —OH or —NH$_2$; and $Y_4$ and $Z_4$ each represents a monovalent group.

* * * * *

UNITED STATES PATENT AND TRADEMARK OFFICE
CERTIFICATE OF CORRECTION

PATENT NO. : 7,192,475 B2
APPLICATION NO. : 11/010368
DATED : March 20, 2007
INVENTOR(S) : Masaru Takasaki et al.

It is certified that error appears in the above-identified patent and that said Letters Patent is hereby corrected as shown below:

In claim 1, at column 32, line 23, after '100 nm', the phrase --or more-- should be added.
In claim 2, at column 32, line 50, after '100 nm', the phrase --or more-- should be added.
In claim 3, at column 33, line 18, after '100 nm', the phrase --or more-- should be added.
In claim 11, at column 34, line 65, after '100 nm', the phrase --or more-- should be added.

Signed and Sealed this

First Day of January, 2008

JON W. DUDAS
*Director of the United States Patent and Trademark Office*